(12) United States Patent
Kamata et al.

(10) Patent No.: US 11,930,444 B2
(45) Date of Patent: Mar. 12, 2024

(54) COMMUNICATION DEVICE, VEHICLE, AND METHOD FOR RESTRICTING PERFORMANCE OF PERIODIC HOME PUBLIC LAND MOBILE NETWORK SEARCH

(71) Applicant: KYOCERA Corporation, Kyoto (JP)

(72) Inventors: Tokiyasu Kamata, Yokohama (JP); Kousuke Kido, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 422 days.

(21) Appl. No.: 17/331,760

(22) Filed: May 27, 2021

(65) Prior Publication Data

US 2021/0289431 A1    Sep. 16, 2021

Related U.S. Application Data

(63) Continuation of application No. PCT/JP2019/045316, filed on Nov. 19, 2019.

(30) Foreign Application Priority Data

Nov. 28, 2018 (JP) .................................. 2018-222823

(51) Int. Cl.
*H04W 48/16* (2009.01)
*H04W 4/44* (2018.01)
*H04W 52/02* (2009.01)

(52) U.S. Cl.
CPC ............. *H04W 48/16* (2013.01); *H04W 4/44* (2018.02); *H04W 52/0251* (2013.01)

(58) Field of Classification Search
CPC ... H04M 1/00; H04W 4/44; H04W 48/08–18; H04W 52/02; H04W 52/0251
See application file for complete search history.

(56) References Cited

U.S. PATENT DOCUMENTS

| 8,554,163 B2 | 10/2013 | Deshpande et al. | |
| 2005/0107083 A1* | 5/2005 | Rager ................... | H04W 48/16 455/432.1 |
| 2006/0003738 A1* | 1/2006 | Ishikawa ............... | H04W 12/06 455/411 |

(Continued)

FOREIGN PATENT DOCUMENTS

| CN | 102640544 A | 8/2012 |
| JP | 2013-513337 A | 4/2013 |

(Continued)

OTHER PUBLICATIONS

3rd Generation Partnership Project; Technical Specification Group Core Network and Terminals; Non-Access-Stratum (NAS) functions related to Mobile Station (MS) in idle mode (Release 15) 3GPP TS 23.122 V15.5.0, Sep. 2018; pp. 1-62; 3GPP Organizational Partners.

*Primary Examiner* — Ronald Eisner
(74) *Attorney, Agent, or Firm* — Studebaker & Brackett PC

(57) ABSTRACT

A communication device electrically connecting to a vehicle including an engine performs a periodic network search to search for a predetermined network when a network currently used by the communication device is not the predetermined network. The communication device restricts performance of the periodic network search during an off period in which the power source is in an off state.

11 Claims, 6 Drawing Sheets

(56) References Cited

U.S. PATENT DOCUMENTS

| | | | |
|---|---|---|---|
| 2011/0075635 A1* | 3/2011 | Ryu | H04W 36/14 370/332 |
| 2011/0136530 A1* | 6/2011 | Deshpande | H04W 52/0277 455/515 |
| 2016/0219520 A1 | 7/2016 | Hara et al. | |
| 2016/0360486 A1 | 12/2016 | Okawa et al. | |

FOREIGN PATENT DOCUMENTS

| | | |
|---|---|---|
| WO | 2015/056316 A1 | 4/2015 |
| WO | 2015/075969 A1 | 5/2015 |

\* cited by examiner

COMMUNICATION DEVICE, VEHICLE, AND METHOD FOR RESTRICTING PERFORMANCE OF PERIODIC HOME PUBLIC LAND MOBILE NETWORK SEARCH

RELATED APPLICATIONS

The present application is a continuation based on PCT Application No. PCT/JP2019/045316, filed on Nov. 19, 2019, which claims the benefit of Japanese Patent Application No. 2018-222823 on Nov. 28, 2018. The content of which is incorporated by reference herein in their entirety.

TECHNICAL FIELD

The present invention relates to a communication device, a vehicle, and a method.

BACKGROUND ART

Generally, a mobile communication system includes a plurality of networks provided by different telecommunications operators. A user of a communication device signs a contract with any one of the telecommunications operators, and thereby uses a network of the contracted telecommunications operator.

The communication device in an idle mode of waiting for an incoming call performs a periodic network search to search for an available network when a network currently in use is not the network of the contracted telecommunications operator or an equivalent network (for example, see Non Patent Literature 1).

For example, it is necessary to perform a periodic network search while a communication device is under roaming. In a network search, it is necessary to try receiving a radio signal at all frequencies that the communication device can support, and the communication device therefore consumes a large amount of electricity.

CITATION LIST

Non Patent Literature

Non patent Literature 1: 3GPP technical specification "3GPP TS 23.122 V15.5.0", September 2018.

SUMMARY OF INVENTION

Technical Problem

The number of communication devices mounted in a vehicle has been increasing in recent years. Such communication devices are generally driven with electricity supplied from a battery of a vehicle.

However, even when a power source of a vehicle is in an off state, that is, even when a probability is low that a network is newly detected, such communication devices perform a periodic network search in some cases. Such inefficient network searches not only wastefully consume electricity of a battery of a vehicle, but the battery of the vehicle may possibly run out due to the network searches, in the worst case.

Accordingly, an object of the present invention is to provide a communication device, a vehicle, and a method that realize an efficient network search.

Solution to Problem

A communication device according to a first feature includes: a connector configured to electrically connect to a vehicle including a power source; a radio communicator configured to perform a periodic network search to search for a predetermined network when a network currently used by the communication device is not the predetermined network; and a controller configured to restrict performance of the periodic network search during an off period in which the power source is in an off state.

A vehicle according to a second feature includes the communication device according to the first feature.

A method according to a third feature is executed by a communication device electrically connecting to a vehicle including a power source. The method includes: performing a periodic network search to search for a predetermined network when a network currently used by the communication device is not the predetermined network; and restricting performance of the periodic network search which the power source is in an off state.

Advantageous Effect of Invention

According to an aspect of the present invention, a communication device, a vehicle, and a method can be provided that make it possible to efficiently perform a network search.

DESCRIPTION OF EMBODIMENTS

An embodiment will be described below with reference to the drawings.

(Configuration of Mobile Communication System)

Figure 1:
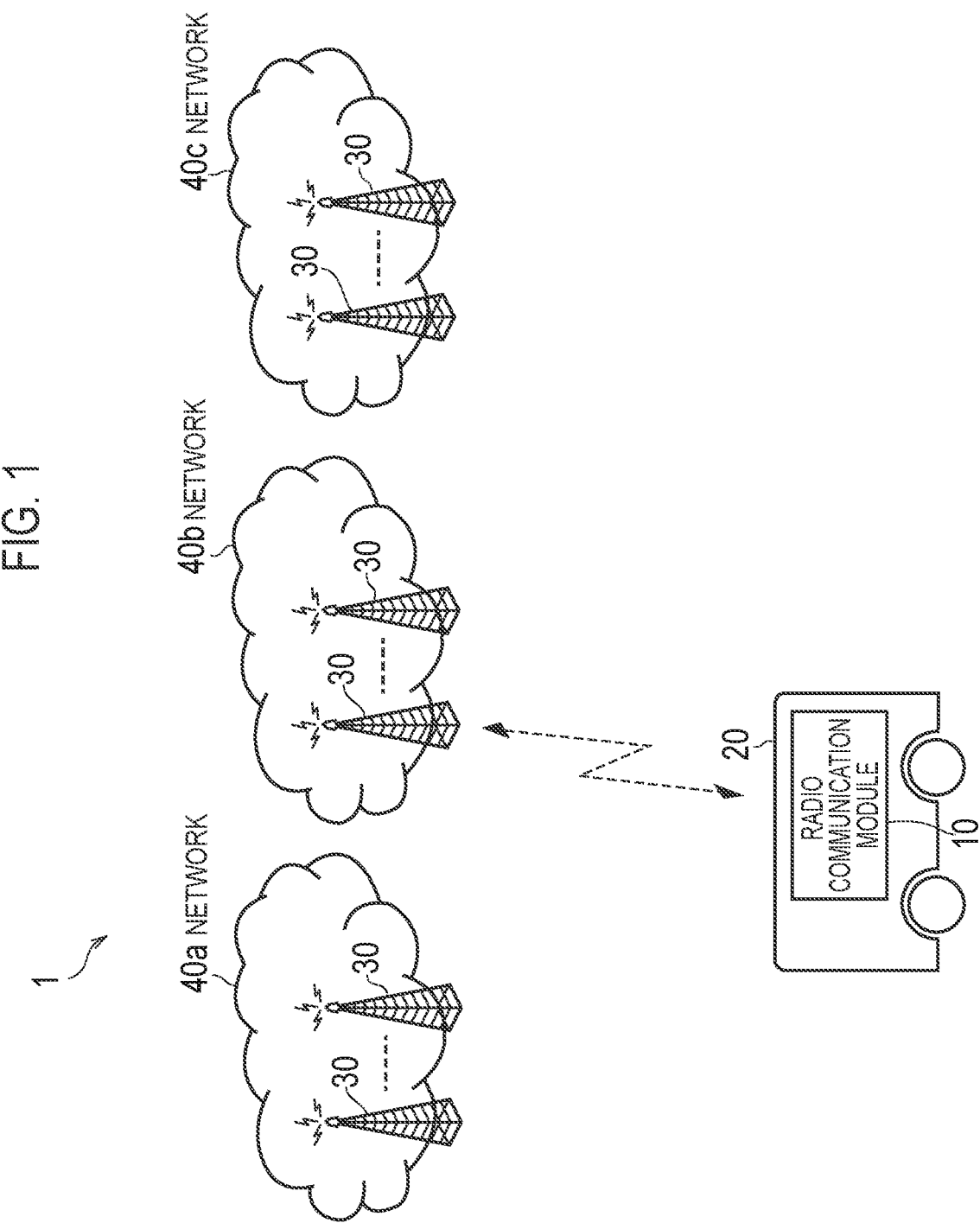
FIG. 1 is a diagram illustrating a configuration of a mobile communication system according to an embodiment.

FIG. 1 is a diagram illustrating a configuration of a mobile communication system 1 according to an embodiment.

As illustrated in FIG. 1, the mobile communication system 1 includes a vehicle 20 with a radio communication module 10 on board, and a plurality of networks 40 (40a to 40c) provided by different telecommunications operators. The radio communication module 10 is an example of a communication device. In some cases, each network 40 is referred to as PLMN (Public Land Mobile Network).

Each network 40 includes a plurality of base stations 30. Each base station 30 may support any mobile communication system, for example, a 2G mobile communication system such as GSM® (Global System for Mobile communications), a 3G mobile communication system such as CDMA (Code Division Multiple Access), or a 4G mobile communication system such as LTE (Long Term Evolution), or further a 5G mobile communication system. Each base station 30 periodically broadcasts a PLMN number indicating a network 40 to which the base station 30 belongs. Note that each base station 30 manages one or more cells.

The radio communication module 10 is a module that implements various functions. For example, when an emergency call system is implemented, the radio communication module 10, in an emergency, places a call to a PSAP (Public Safety Answering Point) including an emergency call center. After a telephone conversation with a PSAP operator, the radio communication module 10 receives a call from the PSAP in some cases. The radio communication module 10 may be configured to be capable of placing or receiving a call with IP telephony based on VoIP (Voice over Internet Protocol) or the like.

Moreover, a telematics service is known that provides an information service in real time by combining the vehicle 20 and a communication system. In the telematics service, map data and POI (point of interest) data to update data on a navigation system are downloaded from a server on a network 40. Moreover, in the telematics service, diagnostic information on an in-vehicle device is uploaded to the server on the network 40. The radio communication module 10 performs such a download and an upload via networks 40.

In FIG. 1, the radio communication module 10 is illustrated as an IVS (In Vehicle System) mounted in a mobile object such as the vehicle 20. The mobile object may be any object that moves, such as a ship, a train, or a mobile terminal (radio terminal) such as a mobile telephone or a smartphone. The vehicle 20 may be an automobile, such as a two-wheeled automobile, a three-wheeled automobile, or a four-wheeled automobile. The radio communication module 10 is driven with electricity supplied from a battery of the vehicle 20.

The radio communication module 10 may support any mobile communication system, such as a 2G mobile communication system, a 3G mobile communication system, a 4G mobile communication system, or further a 5G mobile communication system. The radio communication module 10 may include a function for executing the various functions and a program created by a user.

A telecommunications operator operating each network 40 provides a mobile communication service of its own to a user who has signed a contract with the telecommunications operator. A user of the radio communication module 10 signs a contract with any one of the telecommunications operators and thereby uses the network of the contracted telecommunications operator.

The radio communication module 10 in an idle mode of waiting for an incoming call performs a periodic network search to search for an available network when a network currently in use is not the network of the contracted telecommunications operator (HPLMN: Home PLMN) or an equivalent network (EHPLMN: Equivalent HPLMN). Hereinafter, such a network search will be referred to as HPLMN search.

For example, while the radio communication module 10 is under roaming in a visited network (VPLMN: Visited PLMN), it is necessary to perform a periodic HPLMN search. Thus, it is made easier for the radio communication module 10 to use the HPLMN or the EHPLMN, instead of the VPLMN. Accordingly, incurrence of roaming expenses can be reduced, and a good service can be received from the HPLMN or the EHPLMN.

However, in an HPLMN search, it is necessary to try receiving a radio signal at all frequencies that the radio communication module 10 can support, which leads to a problem that the radio communication module 10 consumes a large amount of electricity.

(Configurations of Radio Communication Module and Vehicle)

Figure 2:
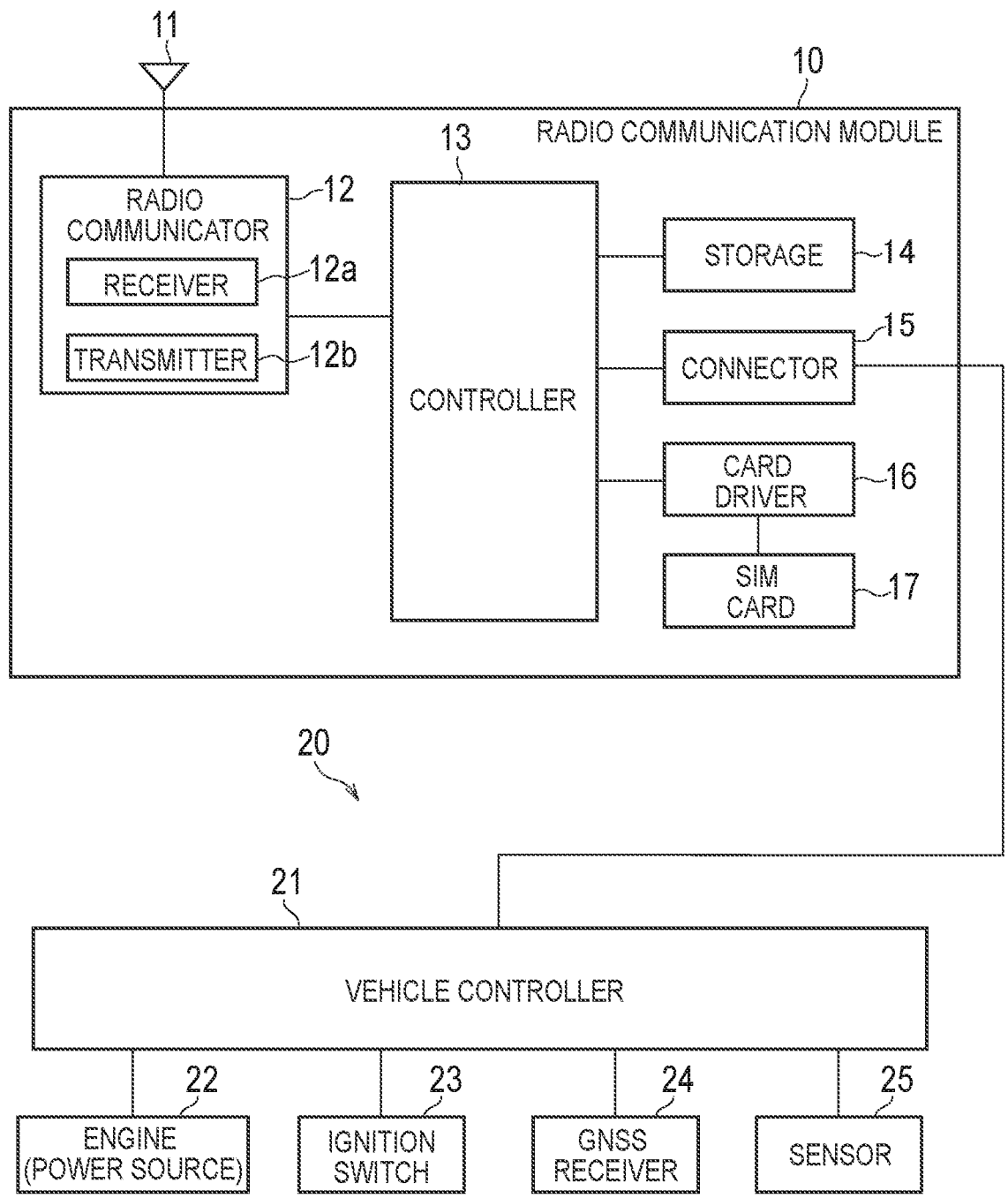
FIG. 2 is a diagram illustrating configurations of the radio communication module and the vehicle according to the embodiment.

FIG. 2 is a diagram illustrating configurations of the radio communication module 10 and the vehicle 20 according to the embodiment. However, with respect to the configuration of the vehicle 20, only portions related to the radio communication module 10 are depicted.

As illustrated in FIG. 2, the radio communication module 10 includes an antenna 11, a radio communicator 12, a controller 13, a storage 14, a connector 15, a card driver 16, and a SIM (Subscriber Identity Module) card 17.

The antenna 11 transmits and receives radio signals to/from the base stations 30.

The radio communicator 12 is to perform radio communication with the base stations 30 via the antenna 11. The radio communicator 12 includes a receiver 12a and a transmitter 12b.

The receiver 12a, as analog signal processing, performs amplification, down-conversion, analog-digital conversion processing, and the like of a radio signal received from the antenna 11. The receiver 12a demodulates and decodes a digital signal, and transfers decoded data to the controller 13.

The transmitter 12b, as digital signal processing, encodes data transferred from the controller 13 and modulates the data such that the data can be transmitted through a communication channel of a radio signal. The transmitter 12b, as analog signal processing, performs digital-analog conversion processing of a digital signal, up-conversion, amplification of an analog signal, and the like, and transmits a radio signal via the antenna 11.

The controller 13 is configured mainly by using a microcomputer including a CPU (Central Processing Unit) that executes various programs, a ROM (Read Only Memory), a RAM (Random Access Memory), a backup RAM, an I/O (Input/Output), and the like, and is to perform various types of processing by executing various control programs stored in the ROM. The controller 13 performs processing required to control the radio communicator 12.

The storage 14 is configured by using an EEPROM (Electronically Erasable and Programmable Read Only Memory) or the like, a content of which can be electrically rewritten, and stores a program and information required to control the radio communicator 12.

The connector 15 is an interface for electrically connecting the radio communication module 10 to the vehicle 20 and is, for example, a USB IF (interface), any other IF, or the like. The connector 15 is electrically connected to a vehicle controller 21 provided to the vehicle 20.

The card driver 16 drives an IC (Integrated Circuit) card referred to as SIM card (or UIM (User Identity Module) card), that is, an information card. The card driver 16 may be configured such that the SIM card 17 can be inserted into and removed from the card driver 16. When the card driver 16 is caused by the controller 13 to read or write information, the card driver 16 reads information recorded in the SIM card 17 or writes information into the SIM card 17.

The SIM card 17 is an IC card in which information for identifying a subscriber, operator identification information (an HPLMN number, an EHPLMN number, or the like) for identifying a telecommunications operator, a search period (a value on an HPLMN search timer) for a periodic HPLMN search, information related to a service available under contract to the subscriber, and the like are recorded. In the SIM card 17, information required to receive the service is recorded. Such information is, for example, information used when position information is registered, information related to a telephone number (for example, an IVS telephone number), or the like.

The SIM card 17 may be an eSIM (Embedded SIM) of an embedded type. The SIM card 17 may exist outside of the radio communication module 10. The SIM card 17 may be supplied from the telecommunications operator, or may be obtained by any other means. The user becomes able to use the radio communication module 10 by installing the supplied SIM card 17 in, or connecting the supplied SIM card 17 to, the radio communication module 10.

The vehicle 20 includes the vehicle controller 21, an engine 22, an ignition switch 23, a GNSS receiver 24, and a sensor 25.

The vehicle controller 21 is configured mainly by using a microcomputer including a CPU that executes various programs, a ROM, a RAM, a backup RAM, an I/O, and the like, and is to perform various types of processing by executing various control programs stored in the ROM. In some cases, the vehicle controller 21 is referred to as ECU (Electronic Control Unit). The vehicle controller 21 collects various types of information on the vehicle 20 and provides the collected information to the radio communication module 10.

The engine 22 is an example of a power source that generates driving force of the vehicle 20. Although the engine 22 is illustrated as the power source in the embodiment, a motor may be used for the power source, in place of the engine 22. The engine 22 is controlled by the vehicle controller 21.

The ignition switch 23 is a switch for switching the engine 22 between an on state and an off state. When the ignition switch 23 receives an on/off operation, the ignition switch 23 outputs a signal according to a content of the operation to the vehicle controller 21. The vehicle controller 21 switches the engine 22 between the on state and the off state, based on the signal inputted from the ignition switch 23.

The GNSS receiver 24 acquires position information (latitude and longitude information) and outputs the acquired position information to the controller 13. The GNSS receiver 24 may include a GPS (Global Positioning System) receiver, a GLONASS (Global Navigation Satellite System) receiver, an IRNSS (Indian Regional Navigational Satellite System) receiver, a COMPASS receiver, a Galileo receiver, a QZSS (Quasi-Zenith Satellites System) receiver, or the like. Although the configuration in which the GNSS receiver 24 is provided to the vehicle 20 is illustrated in the embodiment, the GNSS receiver 24 may be provided to the radio communication module 10.

The sensor 25 senses rotations of a drive shaft (or wheels) of the vehicle 20 and outputs information indicating a result of the sensing to the vehicle controller 21.

(Operation of Radio Communication Module)

Figure 3:
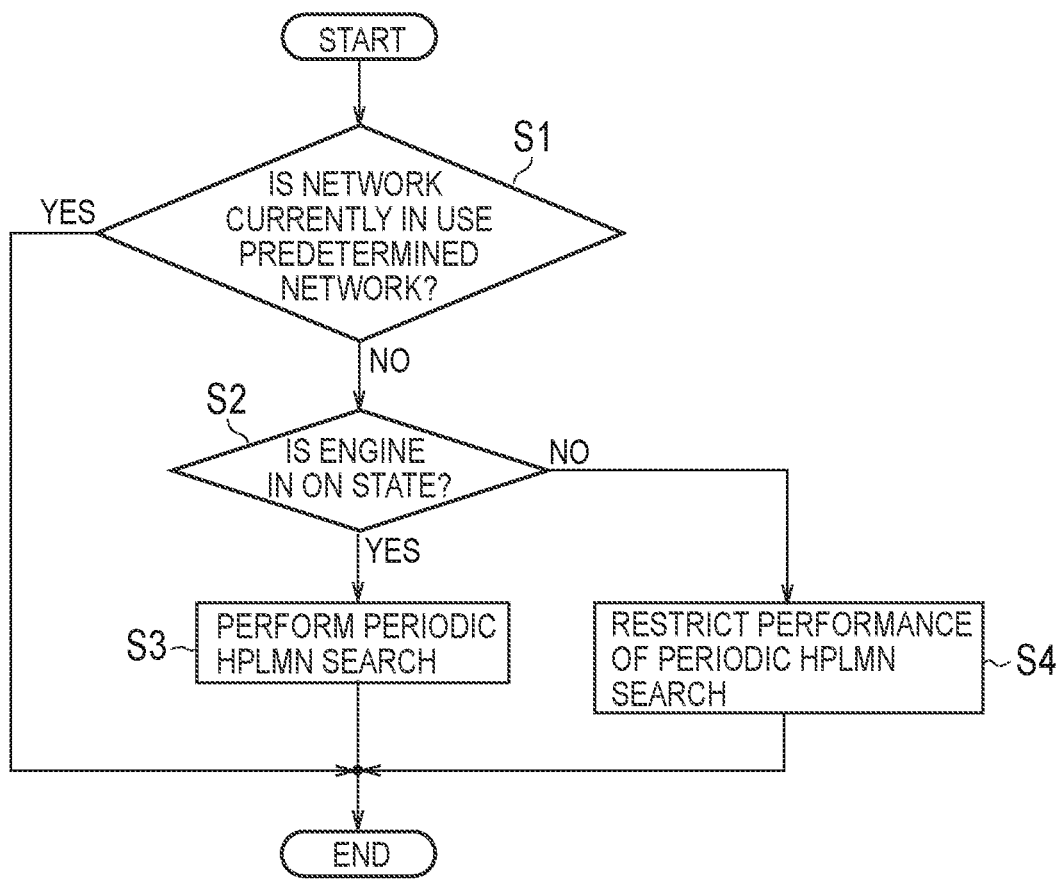
FIG. 3 is a diagram illustrating operation of the radio communication module according to the embodiment.

FIG. 3 is a diagram illustrating operation of the radio communication module 10 according to the embodiment. The present operation flow is based on a premise that a mode of the radio communication module 10 is the idle mode.

As illustrated in FIG. 3, in step S1, the controller 13 determines whether or not a network 40 currently used by the radio communication module 10 is a predetermined network. Specifically, the controller 13 determines whether or not a network 40 to which a cell (base station 30) currently selected by the radio communication module 10 belongs is a predetermined network. A predetermined network is, for example, the HPLMN that is the network contracted by the radio communication module 10, or the EHPLMN that is a network equivalent to the contracted network.

When the network 40 currently used by the radio communication module 10 is not a predetermined network (step S1: NO), in step S2, the controller 13 determines whether or not the engine 22 is in the on state. For example, the controller 13 determines whether or not the engine 22 is in the on state, by acquiring information indicating a state of the engine 22 from the vehicle controller 21 via the connector 15.

When the engine 22 is in the on state (step S2: YES), in step S3, the controller 13 controls the radio communicator 12 such that the radio communicator 12 performs a periodic HPLMN search to search for a predetermined network, based on the information recorded in the SIM card 17. When the HPLMN or the EHPLMN is detected through the HPLMN search, the controller 13 controls the radio communicator 12 such that a cell belonging to the detected network is selected, and finishes the HPLMN search.

When the engine 22 is in the off state (step S2: NO), in step S4, the controller 13 restricts performance of HPLMN searches during an off period in which the engine 22 is in the off state. Since the radio communication module 10 and the vehicle 20 do not move and a probability is low that a predetermined network is detected during the off period, electricity consumed by the radio communication module 10 can be reduced by restricting performance of HPLMN searches.

During the off period (step S4), the controller 13 may control the radio communicator 12 such that the radio communicator 12 performs an HPLMN search to search for a predetermined network only a predetermined number of times. It is preferable that the predetermined number of times is one time. There is a possibility that a position at a point of time when the engine 22 switches to the off state is changed from a position at a point of time when a last HPLMN search is performed while the engine 22 is in the on state. Accordingly, since a predetermined network can possibly be detected, an HPLMN search is performed only one time during the off period. In a situation where only one-time HPLMN search is not enough to find the HPLMN, an HPLMN search may be performed one or more times.

Figure 4:
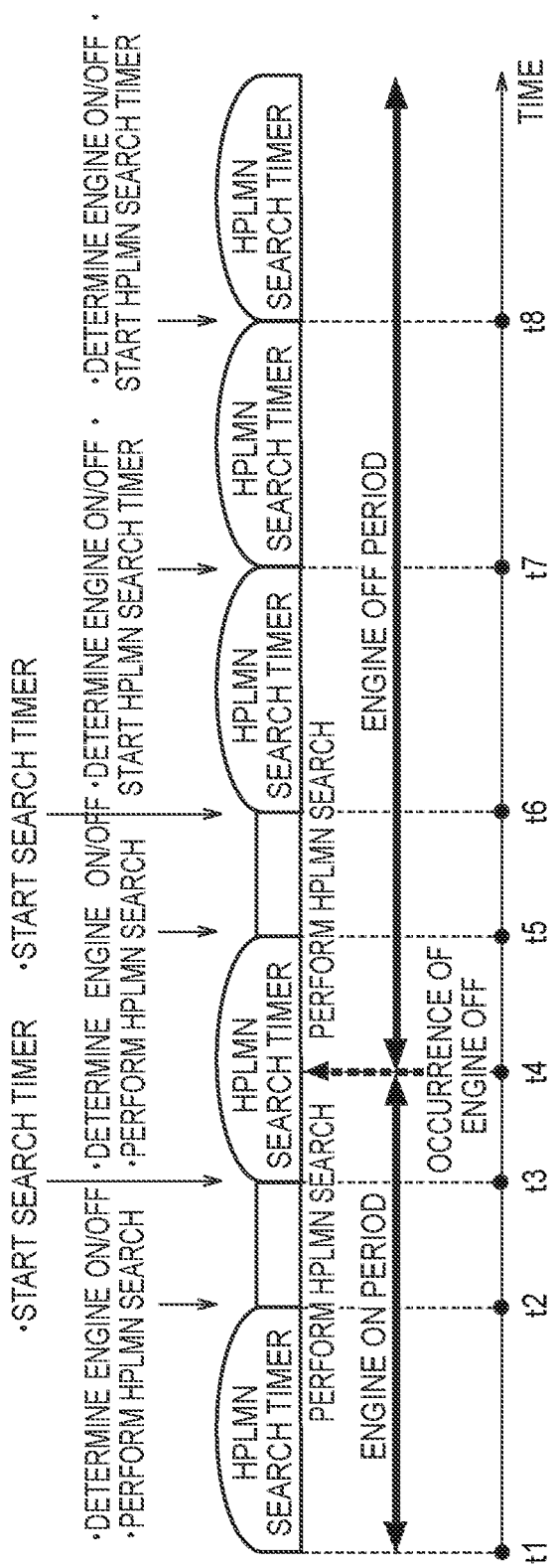
FIG. 4 is a diagram illustrating an example of operation of the radio communication module when the engine switches from the on state to the off state.

FIG. 4 is a diagram illustrating an example of operation of the radio communication module 10 when the engine 22 switches from the on state to the off state.

As illustrated in FIG. 4, at time t4, the engine 22 switches from the on state to the off state. A time period before the time t4 is an on period of the engine 22, and a time period after the time t4 inclusive is the off period of the engine 22.

First, at time t1, the controller 13 starts the HPLMN search timer. Each time the HPLMN search timer expires, the controller 13 determines whether or not the engine 22 is in the on state. When the engine 22 is in the on state when the HPLMN search timer expires, the controller 13 controls the radio communicator 12 such that the radio communicator 12 performs an HPLMN search (time t2). When no predetermined network is detected through the HPLMN search, the controller 13 starts the HPLMN search timer again (time t3).

Next, the engine 22 switches to the off state at the time t4, and thereafter when the HPLMN search timer expires at time t5, the controller 13 determines whether or not the engine 22 is in the on state. Here, the controller 13 determines that the engine 22 is in the off state. When the controller 13 determines for a first time that the engine 22 is in the off state after the engine 22 switches to the off state, the controller 13 controls the radio communicator 12 such that the radio communicator 12 performs an HPLMN search. As a result, an HPLMN search is performed over a period from the time t5 until time t6.

As described above, after the engine 22 switches from the on state to the off period, the controller 13 controls the radio communicator 12 such that the radio communicator 12 performs an HPLMN search at a timing determined according to a search period for a periodic HPLMN search (that is, the time t5).

Next, when no predetermined network is detected through the HPLMN search, the controller 13 starts the HPLMN search timer again (time t6). Thereafter, when the controller 13 determines that the engine 22 is in the off state each time the HPLMN search timer expires, the controller 13 starts the HPLMN search timer again, without causing the radio communicator 12 to perform an HPLMN search.

As described above, during the off period in which the engine 22 is in the off state, the radio communication module 10 restricts performance of periodic HPLMN searches. Thus, since inefficient HPLMN searches performed when a probability is low that a network (the HPLMN or the EHPLMN) is newly detected can be reduced, electricity of the battery of the vehicle 20 can be saved.

Figure 5:
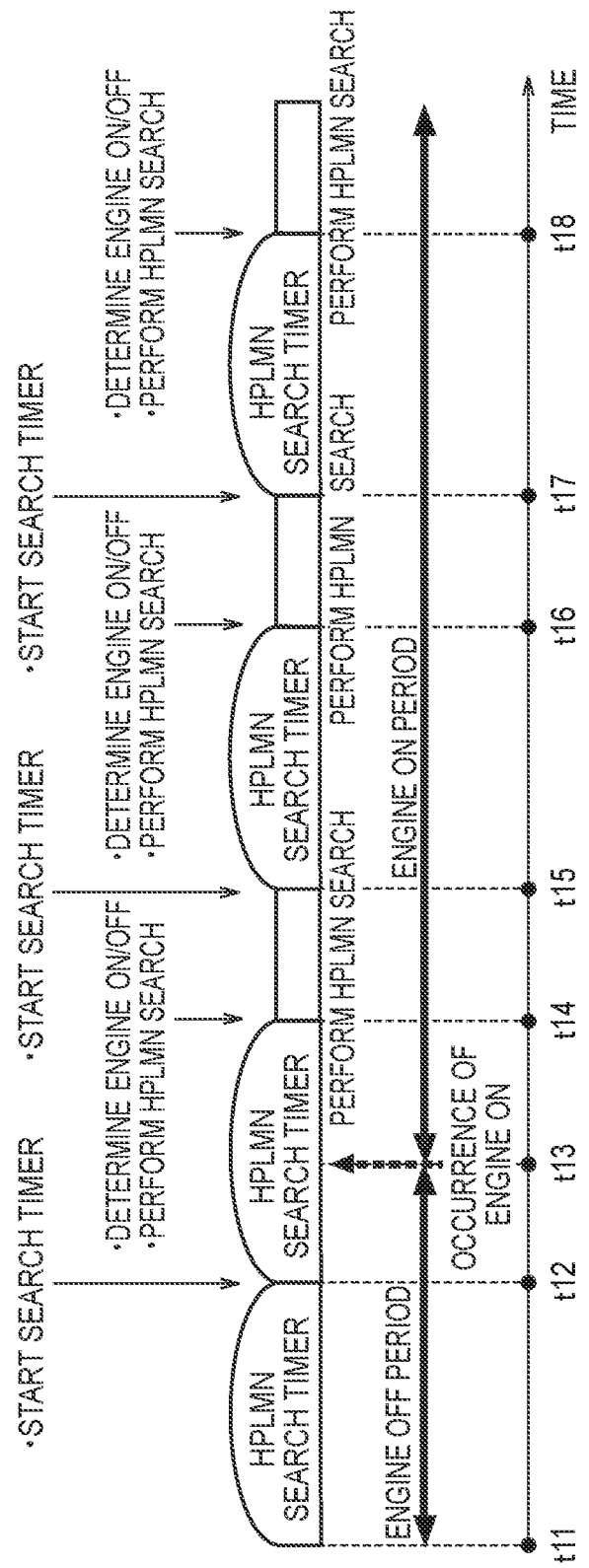
FIG. 5 is a diagram illustrating an example of operation of the radio communication module when the engine switches from the off state to the on state.

FIG. 5 is a diagram illustrating an example of operation of the radio communication module 10 when the engine 22 switches from the off state to the on state.

As illustrated in FIG. 5, at time t13, the engine 22 switches from the off state to the on state. A time period before the time t13 is the off period of the engine 22, and a time period after the time t13 inclusive is the on period of the engine 22.

First, during the off period of the engine 22, when the controller 13 determines that the engine 22 is in the off state each time the HPLMN search timer expires, the controller 13 starts the HPLMN search timer again, without causing the radio communicator 12 to perform an HPLMN search (time t11, time t12).

Next, the engine 22 switches to the on state at the time t13, and thereafter when the HPLMN search timer expires at time t14, the controller 13 determines whether or not the engine 22 is in the on state. Here, the controller 13 determines that the engine 22 is in the on state. After the engine 22 switches to the on state, the controller 13 controls the radio communicator 12 such that the radio communicator 12 performs an HPLMN search, each time the controller 13 determines for a first time that the engine 22 is in the on state (time t14, time t16, time t18).

(Modification Example of Operation of Radio Communication Module)

In the above-described operation of the radio communication module 10, a state of movement of the vehicle 20 when the engine 22 is in the on state is not particularly taken into consideration. However, operation may take a state of movement of the vehicle 20 into consideration.

Figure 6:
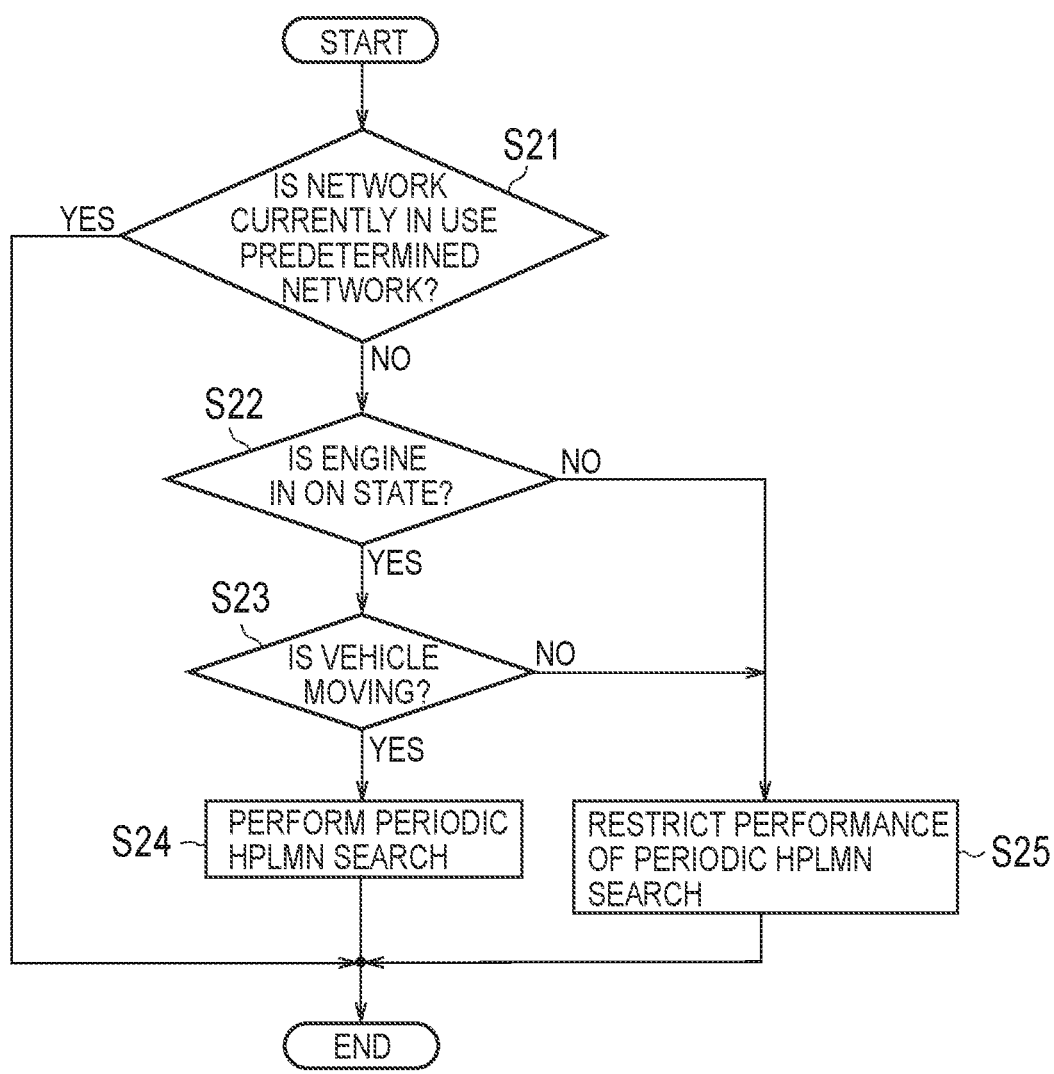
FIG. 6 is a diagram illustrating a modification example of the operation of the radio communication module illustrated in FIG. 5.

FIG. 6 is a diagram illustrating a modification example of the operation of the radio communication module 10 illustrated in FIG. 3. Here, a difference from FIG. 3 will be described.

As illustrated in FIG. 6, although a content of each processing in step S21, S22, S24, S25 is similar to the processing in FIG. 3, the difference from FIG. 3 is that determination in step S23 is performed.

When the engine 22 is in the on state (step S22: YES), in step S23, the controller 13 determines whether or not the vehicle 20 is moving. For example, the controller 13 determines whether or not the vehicle 20 is moving, by acquiring position information obtained by the GNSS receiver 24, or measurement information obtained by the sensor 25, from the vehicle controller 21 via the connector 15.

When the vehicle 20 is moving (step S23: YES), in step S24, the controller 13 controls the radio communicator 12 such that the radio communicator 12 performs a periodic HPLMN search to search for a predetermined network, based on the information recorded in the SIM card 17.

When the vehicle 20 is not moving (step S23: NO), in step S25, the controller 13 restricts performance of periodic HPLMN searches while the vehicle 20 is in a stop. A stop means that a position of the vehicle 20 is not changed. Details of the operation of restricting performance of periodic HPLMN searches are similar to the above-described embodiment.

OTHER EMBODIMENTS

A program may be provided to cause a computer to execute each process of the radio communication module 10. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example. The radio communication module 10 may be embodied as a semiconductor integrated circuit (chipset, SoC, etc.) by integrating the circuits that execute the respective operations of the radio communication module 10.

While embodiments have been described in detail with reference to the drawings, specific configurations are not limited to the ones mentioned above and various design changes and the like can be made without departing from the scope of the invention.

The invention claimed is:

1. A communication device comprising:
a connector configured to electrically connect to a vehicle including a power source;
a radio communicator configured to perform a periodic network search to search for a predetermined network when a network currently used by the communication device is not the predetermined network; and
a controller configured to restrict performance of the periodic network search during an off period in which the power source is in an off state,
wherein the controller is configured to control the radio communicator so that the radio communicator performs the network search to search for the predetermined network a predetermined number of times during the off period.

2. The communication device according to claim 1, wherein
the predetermined network is an HPLMN (Home Public Land Mobile Network) that is a network contracted by the communication device, or an EHPLMN (Equivalent Home Public Land Mobile Network) that is a network equivalent to the contracted network.

3. The communication device according to claim 1, wherein
the controller is configured to control the radio communicator so that the radio communicator performs the network search at a timing determined according to a search period for the periodic network search, after switching from an on period in which the power source is in an on state to the off period.

4. The communication device according to claim 1, wherein the predetermined number of times is one time.

5. A communication device comprising:
- a connector configured to electrically connect to a vehicle including a power source;
- a radio communicator configured to perform a periodic network search to search for a predetermined network when a network currently used by the communication device is not the predetermined network; and
- a controller configured to restrict performance of the periodic network search during an off period in which the power source is in an off state, wherein
the controller is configured to:
- determine whether or not the vehicle is moving during an on period in which the power source is in an on state; and
- restrict performance of the periodic network search when the vehicle is in a stop during the on period.

6. The communication device according to claim 5, wherein
the controller is configured to control the radio communicator so that the radio communicator performs the network search to search for the predetermined network a predetermined number of times when the vehicle is in a stop during the on period.

7. The communication device according to claim 6, wherein
the controller is configured to control the radio communicator so that the radio communicator performs the network search at a timing determined according to a search period for the periodic network search after the vehicle comes to the stop during the on period.

8. The communication device according to claim 6, wherein the predetermined number of times is one time.

9. A vehicle comprising the communication device according to claim 1.

10. A method executed by a communication device electrically connecting to a vehicle including a power source, the method comprising:
- performing a periodic network search to search for a predetermined network when a network currently used by the communication device is not the predetermined network;
- restricting performance of the periodic network search during an off period in which the power source is in an off state; and
- performing the network search to search for the predetermined network a predetermined number of times during the off period.

11. A method executed by a communication device electrically connecting to a vehicle including a power source, the method comprising:
- performing a periodic network search to search for a predetermined network when a network currently used by the communication device is not the predetermined network;
- restricting performance of the periodic network search during an off period in which the power source is in an off state;
- determining whether or not the vehicle is moving during an on period in which the power source is in an on state; and
- restricting performance of the periodic network search when the vehicle is in a stop during the on period.

* * * * *